United States Patent
Al-Karaghouli et al.

(10) Patent No.: US 12,476,480 B2
(45) Date of Patent: Nov. 18, 2025

(54) ELECTRICAL SYSTEM AND A METHOD OF CONTROLLING AN OPERATING VOLTAGE OF AN ELECTRICAL SYSTEM

(71) Applicant: Hamilton Sundstrand Corporation, Charlotte, NC (US)

(72) Inventors: Ali Khalid Al-Karaghouli, West Midlands (GB); Kashav Sehra, Birmingham (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 212 days.

(21) Appl. No.: 18/208,625

(22) Filed: Jun. 12, 2023

(65) Prior Publication Data
US 2023/0399118 A1 Dec. 14, 2023

(30) Foreign Application Priority Data
Jun. 13, 2022 (EP) .................................... 22178683

(51) Int. Cl.
*B64D 31/06* (2024.01)
*H02J 9/06* (2006.01)

(52) U.S. Cl.
CPC .............. *H02J 9/06* (2013.01); *B64D 31/06* (2013.01)

(58) Field of Classification Search
CPC ........................ B64D 31/06; B64D 2221/00; G01R 27/2605; G01R 31/64; H02J 2207/50; H02J 2310/44; H02J 9/06; G06F 1/263; G06F 1/28; G06F 1/30
See application file for complete search history.

(56) References Cited

U.S. PATENT DOCUMENTS

| | | |
|---|---|---|
| 8,155,903 B2 | 4/2012 | Weber et al. |
| 9,740,258 B2 | 8/2017 | Morning-Smith et al. |
| 10,186,898 B2 | 1/2019 | Stupka |
| 10,768,244 B2 | 9/2020 | Carpenter, Jr. et al. |
| 11,056,899 B2 | 7/2021 | Lindsay |
| 11,061,066 B1* | 7/2021 | Kaplan ............... G01R 31/008 |
| 11,095,118 B2 | 8/2021 | Humayun et al. |
| 2013/0285449 A1 | 10/2013 | Schmidt et al. |
| 2020/0091747 A1* | 3/2020 | Merkl ...................... H02J 7/00 |
| 2021/0351595 A1 | 11/2021 | Mocanu et al. |

FOREIGN PATENT DOCUMENTS

WO WO-2014110018 A1 7/2014

OTHER PUBLICATIONS

Extended European Search Report for European Patent Application No. EP22178683.3, dated Nov. 29, 2022.

* cited by examiner

*Primary Examiner* — Brian P Sweeney

(57) ABSTRACT

A method of controlling an operating voltage of an electrical system for supplying electrical power to a load includes charging an energy storage unit using electrical power at a predetermined voltage, where the energy storage unit includes a capacitor. The method also includes removing the operating voltage and discharging the energy storage unit across a fixed load. The method further includes monitoring a discharge voltage across the fixed load over a period of time; determining a time constant of the energy storage unit based on the monitored discharge voltage; and comparing the time constant to a threshold value. If the time constant is higher than the threshold value, the method includes decreasing the operating voltage. If the time constant is lower than the threshold value, the method includes increasing the operating voltage.

20 Claims, 1 Drawing Sheet

ELECTRICAL SYSTEM AND A METHOD OF CONTROLLING AN OPERATING VOLTAGE OF AN ELECTRICAL SYSTEM

CROSS-REFERENCE TO RELATED APPLICATIONS

This application claims priority to and the benefit of European Patent Application No. 22178683.3, filed Jun. 13, 2022, the entire content of which is incorporated herein by reference.

TECHNICAL FIELD

The present invention relates to a method of controlling an operating voltage of an electrical system for supplying electrical power to a load, and an electrical system for supplying electrical power to a load. In particular, electrical systems for aircraft are contemplated herein.

BACKGROUND

Capacitors are used extensively in electrical systems, and have various functionalities within such systems. One particular use for capacitors is energy storage in electrical systems for supplying power to a load.

Power supplies and electrical systems in general may experience short-term failures or interrupts. Such interruptions will appreciably impact the safety and reliability of devices which need to continue operating during such interruptions. This is of particular concern for aircraft systems and other vehicular systems.

Energy storage capacitors can be used to provide smooth and reliable deliverance of electrical power to components powered by the electrical systems for supplying power during such interruptions. The capacitors charge during periods of uninterrupted power supply, and discharge during power interruptions. Capacitors functioning in this way may be referred to as 'hold-up' capacitors. The period of time for which a capacitor may discharge its stored energy, and thereby maintain continuous power deliverance in an electrical system, is known as the 'hold-up time'. The hold-up time is chosen to be long enough to enact a controlled shutdown of one or more components, or for a power source to resume supply.

The hold-up time of a capacitor is governed by the storable energy of the capacitor. The energy storable by a capacitor, E, can be expressed as:

$$E = \frac{1}{2}CV^2 \quad (1)$$

where C is the capacitance of the capacitor and V is the usable voltage range. The greater the amount of energy storable by the hold-up capacitor, the greater the hold-up time.

Most hold-up designs focus on maximising the capacitor voltage, as increasing the capacitor voltage provides a quadratic increase in the storable energy of the capacitor. However, increasing the capacitor voltage can negatively affect the operational lifetime of the capacitor, i.e. it may accelerate degradation of the capacitor through use. Optimising the capacitor voltage is thus generally performed in line with derating regulations to mitigate this effect. That is, the capacitor is generally operated at a voltage below its normal operating limit.

The time taken for a capacitor to degrade is also affected by a number of environmental factors. For example, the operating temperature, voltage ripple, voltage frequency, humidity and vibrations driving the capacitor can all affect its operational lifetime. As the capacitor ages, its capacitance thereby reduces and its internal resistance increases. As the internal resistance of the capacitor increases, it experiences increased localised heating which further accelerates degradation of the capacitor.

To ensure the capacitance of hold-up capacitors remains suitable for use throughout their operational lifetime, design engineers choose large or oversized capacitors, both in size and capacitance. Such capacitors have a capacitance greatly exceeding the required capacitance during initial use in hold-up designs, in anticipation of the capacitance decreasing over the course of their operational lifetimes. Large capacitors are expensive and bulky, thereby increasing the cost, size and weight of electrical systems in which they are implemented in.

It is desirable to provide hold-up capacitors which are of reduced cost and size whilst still meeting the operational requirements of power supplies for electrical systems.

SUMMARY

Viewed from a first aspect, there is provided a method of controlling an operating voltage of an electrical system for supplying electrical power to a load. The method comprises: charging an energy storage unit using electrical power at a predetermined operating voltage, wherein the energy storage unit comprises a capacitor; removing the operating voltage; discharging the energy storage unit across a fixed load; monitoring a discharge voltage across the fixed load over a period of time; determining a time constant of the energy storage unit based on the monitored discharge voltage; and comparing the time constant to a threshold value; wherein if the time constant is higher than the threshold value, the method comprises decreasing the operating voltage; and wherein if the time constant is lower than the threshold value, the method comprises increasing the operating voltage.

The step of removing the operating voltage may comprise disconnecting a supply of electrical power from a power source to the energy storage unit during a shutdown procedure of the electrical system.

The threshold value may correspond to a predetermined time constant selected to achieve a desired hold-up time at the predetermined operating voltage.

The step of increasing the operating voltage and/or the step of decreasing the operating voltage may comprises adjusting the operating voltage to a value determined to achieve the selected hold-up time based on the predetermined time constant, the time constant and the predetermined operating voltage.

The method may comprise replacing the predetermined operating voltage with the adjusted operating voltage.

Discharging the energy storage unit across the fixed load may comprise activating a switching element to complete an electrical flow path through the fixed load and the energy storage unit.

The step of discharging the energy storage unit across the fixed load is performed once a predetermined time delay has elapsed after removing the operating voltage.

The step of charging the electrical supply unit is performed simultaneously with a step of supplying electrical power to the load.

The method may comprise comparing the time threshold to a maintenance threshold value. If the time constant is lower than the maintenance threshold value, the method may further comprise generating a maintenance signal.

Viewed from a second aspect, there is provided an electrical system for supplying electrical power to a load. The electrical system comprises: power source configured to provide electrical power to the load; a voltage control unit configured to control an operating voltage provided by the power source; an energy storage unit comprising a capacitor, wherein the energy storage unit is arranged to receive electrical power from the power source and to provide electrical power to the load; a fixed load comprising a resistive component and a switching device; a voltage sensor configured to monitor a potential difference across the fixed load; and a controller operable to: charge an energy storage unit using electrical power at a predetermined operating voltage; remove the operating voltage; discharge the energy storage unit across a fixed load; monitor a discharge voltage across the fixed load over a period of time; determine a time constant of the energy storage unit based on the monitored discharge voltage; and compare the time constant to a threshold value; wherein if the time constant is higher than the threshold value, the controller is operable to decrease the operating voltage; and wherein if the time constant is lower than the threshold value, the controller is operable to the operating voltage.

The controller may be operable to initiate a discharge time function configured to activate the switching device of the fixed load.

The controller may be operable to perform any one or more or all of the steps of the method of the first aspect.

Viewed from a third aspect, there is provided an aircraft. The aircraft comprises an electrical system for supplying electrical power to a load. The electrical system comprises an electrical system according to the second aspect, wherein the electrical system is arranged to supply electrical power to a load associated with one or more operations of the aircraft.

Viewed from a fourth aspect, there is provided a distributed power architecture. The distributed power architecture comprises: a plurality of power supplies configured to supply electrical power at a respective predetermined operating voltage; a plurality of loads; and a distribution network arranged to distribute electrical power from the plurality of power supplies to each of the plurality of loads; wherein at least one of the power supplies is an electrical system according to the second aspect.

The controller may be operable to increase and/or decrease the operating voltage of at least two of the power supplies based on the time constant.

Viewed from a fifth aspect, there is provided an aircraft. The aircraft comprises a distributed power architecture according to the fourth aspect, wherein the plurality of loads are associated with one or more operations of the aircraft.

BRIEF DESCRIPTION OF THE DRAWINGS

Certain exemplary embodiments of the invention are described below by way of example only and with reference to the accompanying drawings in which.

DETAILED DESCRIPTION

Figure 1:
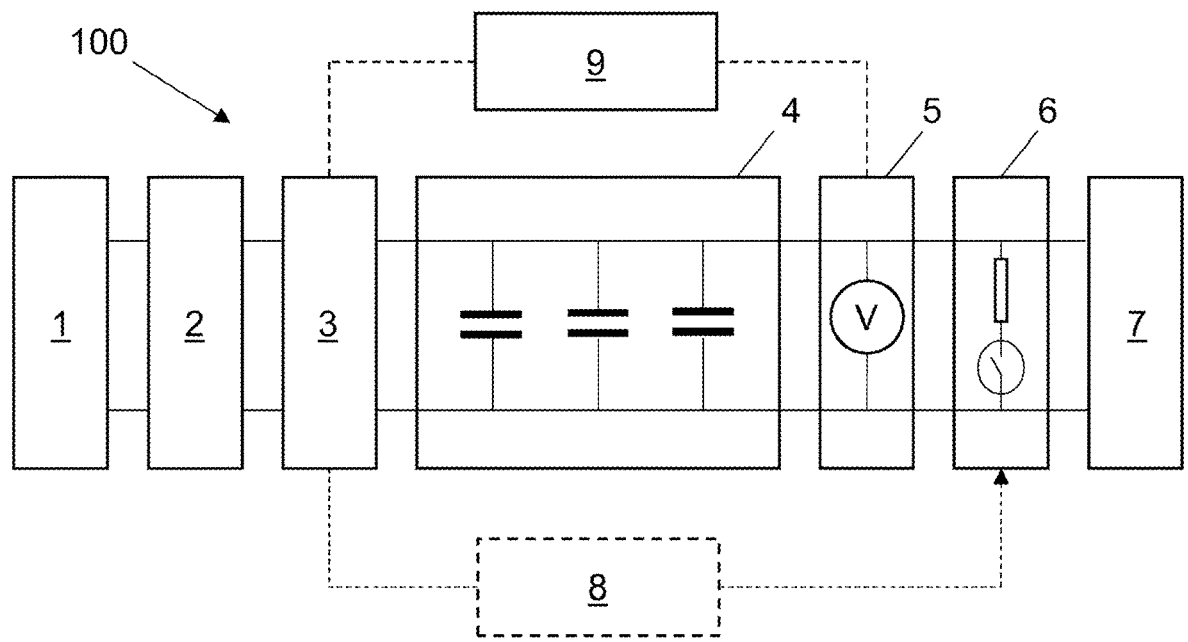
FIG. 1 shows a schematic diagram an electrical system for supplying power.

FIG. 1 shows a schematic diagram of an electrical system 100 for supplying power, in accordance with one or more embodiments. The electrical system comprises a power source 1, an electromagnetic compatibility (EMC) filter 2, a voltage control unit 3, an energy storage unit 4, and a load 7.

The energy storage unit 4 comprises a bank of capacitors, e.g. a plurality of capacitors in parallel. Three capacitors are shown in the FIG. 1 arrangement. However, any arrangement of capacitors could be implemented to achieve the desired capacitance for the energy storage unit 4.

The voltage control unit 3 can also be regarded as a power supply unit. The voltage control unit 3 controls the supply of electrical power from the power source 1. The power source 1 provides electrical power to the energy storage unit 4, thereby charging the capacitors.

In normal use, the voltage control unit 3 controls the supply of electrical power from the power source 1 to both the energy storage unit 4 and the load 7. Ideally, the supply of power from the power source 1 to the load 7 is continuous and uninterrupted. However, interrupts may occur and result in a short-term failure in the supply of electrical power to the load 7 from the power source 1.

During such interruptions the capacitors of the energy storage unit 4 discharge, thereby providing electrical power to the load 7. The energy storage unit 4 thus functions to hold-up electrical charge and supply it to the load 7 during interruptions or power failures, such that a continuous and reliable supply of power is provided to the load 7. In this regard, the capacitors function as hold-up capacitors. Preferably, the one or more capacitors may be supercapacitors (such as, but not limited to, electric double layer capacitors (EDLCs)). In some circumstances, if appropriate, the one or more capacitors may be electrolytic capacitors (such as, but not limited to, non-solid (i.e. wet) tantalum capacitors). Of course, any capacitor considered suitable for an energy storage unit may be used.

The hold-up time of the energy storage unit 4 is dependent on the amount of energy stored by the energy storage unit 4. The more electrical energy stored by the energy storage unit 4, the greater the hold-up time of the energy storage unit 4.

Preferably, the hold-up time of the energy storage unit 4 is of the order of milliseconds. For example, the hold-up time of the energy storage unit 4 may be: greater than 10 ms; greater than 20 ms; greater than 30 ms; greater than 40 ms; greater than 50 ms; greater than 100 ms; greater than 150 ms; or greater than 200 ms, depending on the desired function of the electrical system 100. The hold-up time of the energy storage unit 4 can be set in accordance with various industry standards such as: "RTCA DO-160G, Environmental Conditions and Test Procedures for Airborne Equipment", "ABD0100: Environmental Conditions and Test Requirements Associated to Qualification", and the like.

The electrical system 100 also comprises a fixed load 6, which is at least partially controlled by a discharge time function 8 of the controller 9.

The fixed load 6 comprises a resistor or other suitable resistive load in electrical communication with a switching device. The energy storage unit 4 discharges across the fixed load 6 when the switching device is activated. The resistor may be any component with a fixed resistance, or any component with a known variable resistance. Preferably the fixed load comprises a fixed resistor.

The discharge time function 8 may be provided by the controller 9, as part of the voltage control unit 3, or as a separate piece of hardware. The discharge time function 8 may be provided by one or more of a 555 timer integrated circuit, or an RC timer such as a transistor delay circuit.

As shown in FIG. 1, the controller 9 indirectly controls the discharge time function 8 via control of the voltage control unit 3. In this manner, the controller 9 may utilise existing safety features and/or control logic of the electrical system 100. However, in other embodiments the controller 9 can control the discharge time function 8 directly.

The electrical system 100 also comprises a voltage measurement circuit 5 and a controller 9. The voltage measurement circuit 5 is configured to monitor a voltage of the energy storage unit 4 as it discharges via the fixed load 6, and preferably senses voltage directly across the capacitor to minimise voltage drops across the fixed load 6 and to increase the accuracy of the voltage measurement.

The controller 9 is in communication with both the voltage sensor 5 and the voltage control unit 3. The controller 9 may be in wired or wireless communication with the voltage control unit 3 and the voltmeter 5.

As stated above, in normal use the energy storage unit 4 is charged by the electrical power provided by the power source 1. The electrical power provided by the power source 1 is at a predetermined operating voltage.

The controller 9 is configured to control the operating voltage of the electrical system 100 such that it may be dynamically adjusted in advance of future use. Control of the operating voltage of the electrical system 100 is based on a determined time constant of the energy storage unit 4 and the desired hold up time.

The time constant of a capacitor depends on the resistance of a component through which the capacitor discharges and the capacitance of the capacitor. Accordingly, by determining the time constant of the capacitor as it discharges across the fixed load 6, the capacitance of the energy storage unit 4 may be determined. As the amount of energy that can be stored by the energy storage unit 4 depends on both the capacitance and the supply voltage to the energy storage unit 4, and as the capacitance of the capacitor is subject to change over time (e.g. due to its own electrical series resistance varying with operational lifetime, ambient temperature variations and the like), the operating voltage may be adjusted such that the requisite amount of energy stored by the energy storage unit 4 is met to achieve the desired hold-up time.

By adjusting the operating voltage during the lifetime of the electrical system 100 rather than e.g. maintaining a fixed operating voltage during the lifetime of the electrical system 100, the energy storage unit 4 may be charged using a reduced operating voltage where possible. The operating voltage may be reduced in accordance with derating guidelines, for example. This may improve the operational lifetime of the capacitors of the energy storage unit 4, such that smaller hold-up capacitors may be implemented in the electrical system 100.

Operation of the electrical system 100 as described above will now be discussed in further detail. The controller 9 may be configured to perform or control one or more or all operations of the electrical system 100.

The energy storage unit 4 is charged using electrical power provided from the power source 1. The voltage control unit 3 controls the supply of the electrical power from the power source 1 to the energy storage unit 4. The electrical power is supplied at a predetermined operating voltage. The predetermined operating voltage may be a factory-set value, or may have been previously determined by the controller 9. The energy storage unit 4 is generally charged while the power source 1 simultaneously provides electrical power to the load 7.

The operating voltage provided to the energy storage unit 4 is removed once the energy storage unit 4 is charged. In some embodiments the operating voltage is removed when deactivating the electrical system 100, or when switching off the electrical system 100 (at which point electrical power is no longer supplied to the load 7).

Once the operating voltage is removed, the energy storage unit 4 is discharged across the fixed load 6. Preferably, the energy storage unit 4 is discharged once a predetermined time or delay has elapsed after removing the operating voltage. It will be understood that discharging of the energy storage unit 4 across the fixed load 6 is performed independently of normal use of the electrical system 100, where the energy storage unit 4 will be arranged to discharge across the load 7 when there is a short-term power failure or power interrupt. In such circumstances the energy storage unit 4 may no longer be in electrical communication with the load 7.

The switching device is activated, or engaged, to discharge the energy storage unit 4 across the fixed load 6. Activating the switching device completes a circuit across the fixed load 6, such that the energy storage unit 4 discharges across the fixed load 6. The discharge time function 8 may be arranged to operate the switching device. The discharge time function 8 may be controlled by the voltage control unit 3 and/or the controller 9.

Using the voltage sensor 5, the discharge voltage across the fixed load 6 is monitored over a period of time (e.g. the discharge time). The controller 9 determines the time constant of the energy storage unit 4 based on the monitored discharge voltage.

Capacitors have a discharge voltage which decays according to the following relationship:

$$V = V_0 e^{\frac{-t}{RC}} \qquad (2)$$

where $V$ is the discharge voltage, $V_0$ is the initial charged voltage, $t$ is the period of time and $RC$ is the time constant. The controller 9 determines the time constant based on a rate of decay of the discharge voltage according to this relationship, as monitored by the voltage sensor 5. Theoretically, the discharge voltage will decay to 36.7% of its initial value after a period of time equal to the time constant has elapsed. For practical purposes, however, it may be acceptable to consider the time constant to be equal to the time taken for the discharge voltage to decay to: between 34 to 40% of its initial value; between 35 and 38% of its initial value; or preferably between 36 and 37% of its initial value.

In some embodiments, the controller 9 determines the time constant by monitoring the discharge voltage over a fixed period of time. That is, the controller 9 may determine the time constant by observing by how much the discharge voltage decays in a fixed period of time. The controller 9 may thus determine the time constant according to the following relationship:

$$RC = -T \ln \frac{V}{V_0} \qquad (3)$$

where T is the fixed period of time. The switching device may be controllable or configured to deactivate, or disengage, once the fixed period of time has elapsed.

In other embodiments, with reference to the relationship of equation 3, the controller 9 instead determines the time constant by determining the time it takes for the discharge voltage to decay to approximately a predefined percentage of its initial value (i.e. the ratio of $V/V_0$ may be fixed, rather than the time t). The switching device may be controllable or configured to deactivate, or disengage, once the discharge voltage is observed to decay to the approximately the predefined percentage of its initial value In a preferred embodiment, the controller 9 determines the time constant by taking the time constant to be the time it takes for the discharge voltage to decay to approximately 37% of its initial value. As discussed above, theoretically, the discharge voltage will decay to 36.7% of its initial value after a period of time equal to the time constant has elapsed. For practical purposes, however, the controller 9 may determine the time constant to be a value equal to the time taken for the discharge voltage to decay to: between 34 to 40% of its initial value; between 35 and 38% of its initial value; or preferably between 36 and 37% of its initial value. The switching device may be controllable or configured to deactivate, or disengage, once the discharge voltage is observed to decay to: between 34 to 40% of its initial value; between 35 and 38% of its initial value; or preferably between 36 and 37% of its initial value.

Once the time constant is determined, the controller 9 compares the time constant to a threshold value. The threshold value may comprise a predetermined time constant. The predetermined time constant may correspond to a nominal capacitance required to achieve the desired hold-up time for the predetermined operating voltage.

If the time constant is higher than the threshold value, the controller 9 decreases the predetermined operating voltage. That is, if the energy stored by the energy storage unit 4 (which will be proportional to its capacitance) is greater than required to achieve the desired hold-up time for the predetermined operating voltage, the controller 9 may determine that the predetermined operating voltage may be decreased whilst still achieving the required hold-up time.

If the time constant is lower than the threshold value, the controller 9 increases the predetermined voltage. That is, if the energy stored by the energy storage unit 4 (which will be proportional to its capacitance) is lesser than required to achieve the desired hold-up time for the predetermined operating voltage, the controller 9 may determine that the predetermined operating voltage may need increasing to achieve the required hold-up time.

By dynamically adjusting, or calibrating, the operating voltage of the power source over the course of the lifetime of the electrical system, the life expectancy of the energy storage unit 4, and in turn the electrical system as a whole, may be improved without degrading overall product performance.

Both when the controller 9 increases or decreases the predetermined voltage, the controller 9 can be configured to adjust the operating voltage according to, or at least based on (e.g. accounting for derating guidelines and the like), the following relationship:

$$V_2 = \sqrt{\frac{T_1 V_1^2}{T_2}} \quad (4)$$

where $V_1$ is the predetermined operating voltage, $T_1$ is the predetermined time constant, $V_2$ is the adjusted voltage and $T_2$ is the determined time constant. It can thus be seen that if the determined time constant is greater than the predetermined time constant ($T_2 > T_1$), the operating voltage may be decreased. If the determined time constant is lower than the predetermined time constant ($T_2 < T_1$), the operating voltage may be increased.

If the time constant is equal to the threshold value, the controller 9 maintains the predetermined voltage, i.e. the predetermined voltage may not be adjusted.

In some embodiments the threshold value may be a band, or a range, of values. If the time constant is below the threshold band of values, i.e. if the time constant is lower than a lower threshold value, the controller 9 may increase the predetermined operating voltage. If the time constant is greater than the threshold band of values, i.e. if the time constant is higher than an upper threshold value, the controller 9 may decrease the predetermined operating voltage. If the time constant falls within the threshold band of values the controller 9, i.e. if the time constant is greater than the lower threshold value but below the upper threshold value, the controller 9 may maintain the predetermined voltage.

As described above, the controller 9 adjusts the predetermined operating voltage based on the time constant of the energy storage unit 4. The adjusted operating voltage may replace the predetermined operating voltage, such that future operations of the electrical system 100 utilise the adjusted operating voltage in place of the predetermined operating voltage. The adjusted operating voltage can be stored in a read-write memory or the like associated with the controller 9 and/or the voltage control unit 3. The voltage control unit 3 is preferably operated by the controller 9 to control the supply of electrical power from the power source 1 according to the adjusted operating voltage.

In some embodiments the controller 9 is configured to iteratively adjust the predetermined operating voltage based on the determined time constant after each use (e.g. upon shutdown) of the electrical system 100.

In other embodiments, the controller 9 is configured to iteratively adjust the predetermined operating voltage based on the determined time constant at the beginning of each use (e.g. upon start-up) of the electrical system 100.

In some embodiments, when the electrical system 100 is switched off or disengaged the discharge time function 8 may activate the switching device of the fixed load 6 and enable the energy storage unit 4 to discharge by dissipating electrical power across the fixed load 6. In this way, the electrical system 100 may be made safer as the energy storage unit 4 and the capacitors thereof are not kept in a live state (i.e. a charged state) when not in use.

In some embodiments, the controller 9 is configured to compare the time constant to a maintenance threshold value. The maintenance threshold value may comprise a maintenance time constant. As the capacitors of the energy storage unit 4 age, their capacitance will decrease. Hence the maintenance time constant may correspond to a nominal capacitance at which maintenance of the energy storage unit 4 and/or the electrical system 100 is contemplated or anticipated.

If the time constant is below the maintenance threshold value, the controller 9 may be configured to generate a maintenance signal. When the time constant is below the maintenance threshold value, it may be an indication the capacitance has decreased to a value at which maintenance of the energy storage unit 4 may be required, or be scheduled to be required, to maintain the hold-up time of the energy storage unit 4.

If the time constant is above the maintenance threshold value, the controller 9 may be configured to not generate a maintenance signal. That is, the capacitance of the energy storage unit 4 may be of a value acceptable for continued use of the electrical system 100 without imminent or scheduled maintenance.

The controller 9 may be configured to send the maintenance signal to one or more control panels or control systems in communication with the controller 9.

By monitoring the time constant over the course of the lifetime of the electrical system 100, early signs of failures may also be detected to facilitate the scheduling of maintenance of the electrical system 100 and systems incorporating the electrical system.

According to one or more embodiments, the electrical system 100 may be an electrical system 100 for an aircraft. The load 7 may be one or more of a motor e.g. for an actuator or a turbine and the like, or a compressor or condenser of a climate conditioning system (e.g. a HVAC system), or the load 7 may be a further electrical system such as an engine control system, a navigation control system, or an inflight entertainment system, or the like.

Figure 2:
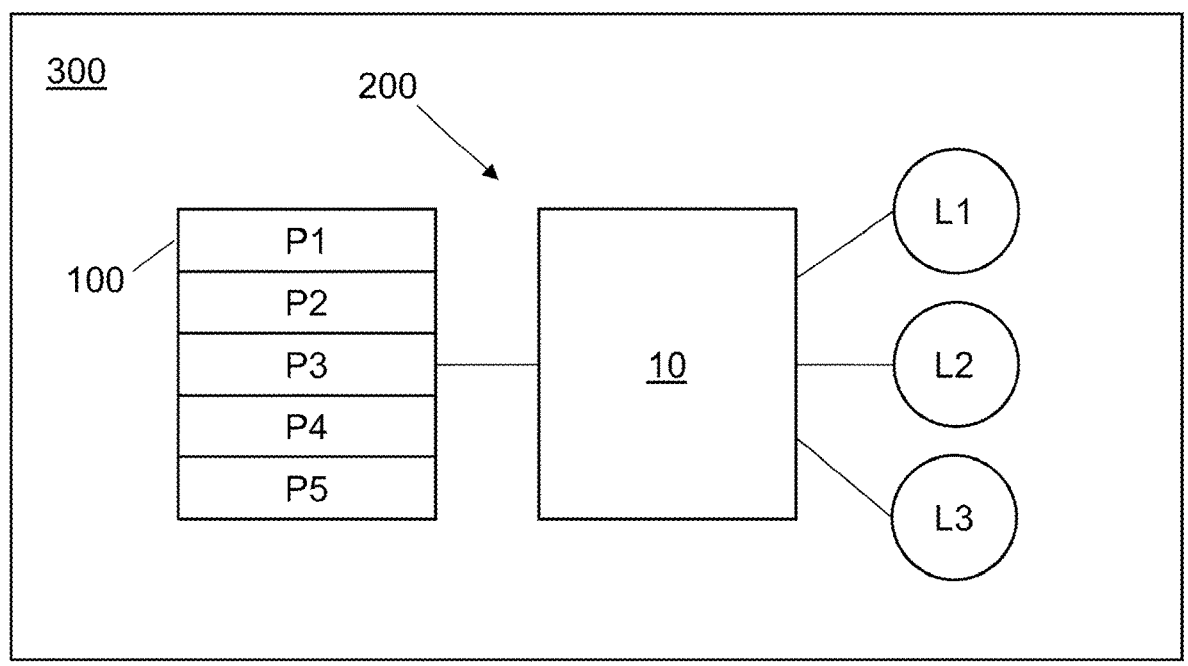
FIG. 2 schematically illustrates a distributed power architecture comprising a plurality of electrical systems for supplying power.

FIG. 2 shows a schematic representation of a distributed power architecture 200 according to one or more embodiments. The distributed power architecture 200 comprises a plurality of power supplies P1-P5, a distribution network 10 and a plurality of loads L1-L3. The distributed power architecture 200 utilises a plurality of power supplies P1-P5 to provide a single bulk supply. Each power supply P1-P5 comprises a power source 1, an EMC filter 2, a voltage control unit 3, an energy storage unit 4 comprising at least one capacitor, a discharge time function 8 and a fixed load 6 as shown in FIG. 1. The distribution network 10 and the plurality of loads L1-L3 may act as a 'common load' for each power supply P1-P5. The distribution network 10 directs a supplied voltage to a point of need, i.e. any of the plurality of loads L1-L3, as needed. A plurality of DC-DC converters may be employed in the distribution network 10 to achieve the desired voltage at each of the plurality of loads L1-L3.

In some embodiments, at least one of the power supplies P1-P5 is an electrical supply 100 as described in relation to FIG. 1. As shown in FIG. 2, power supply P1 is an electrical system 100 as described in regards to FIG. 1. The load 7 will be replaced by the distribution network 10 and the plurality of loads L1-L3. Further to the configuration of each of the other power supplies P2-P5, the power supply P1 will comprise a voltage sensor 5 and a controller 9.

The power supply P1 will be operated in accordance with the above description of the operation of the electrical system 100. Discussion of the operation of the power supply P1 identical to that of the electrical system 100 will not be repeated.

The controller 9 will determine the time constant of the energy storage unit 4 of the power supply P1, and will adjust the predetermined operating voltage of the power supply P1 accordingly.

Additionally, the controller 9 may be configured to control each of the voltage control units 3 of each of the remaining power supplies P2-P5 in an identical manner. For example, the controller 9 may be configured to increase or decrease each of the predetermined operating voltages of each of the remaining power supplies P2-P5 identically to the power supply P1. In this regard, the controller 9 may be a common controller for each of the power sources P2-P5.

In this manner, determination of how the operating voltage of the power source P1 is to be adjusted is extrapolated and applied to each of the remaining power supplies P2-P5. Whilst the time constant of each of energy storage units 4 of the power sources P2-P5 is not directly monitored, improvements in the operational lifetime of the energy storage units 4 of the power sources P2-P5 are envisaged through common control of the power sources P1-P5.

In other embodiments, each of the power supplies P1-P5 is an electrical supply 100 as described in relation to FIG. 1. Each power supply P1-P5 may be operated in accordance with the above description of the operation of the electrical system 100. Respective controllers 9 may be configured to adjust the operating voltage of each respective power source 1 of each power supply P1-P5 as already described above. Alternatively, a common controller 9 may be implemented which determines the time constant of each respective energy storage unit 4, and adjusts the operating voltage of each power source 1 of each power supply P1-P5 accordingly.

In one or more embodiments, each load L1-L3 is not necessarily used simultaneously. Accordingly, not all power sources P1-P5 are necessary utilised at the same time. The number of power sources P1-P5 utilised at any time may change dynamically depending on the power requirements of the loads L1-L3, or the number of loads L1-L3 demanding power. There is hence flexibility between the number of power sources P1-P5 and the number of loads L1-L3 used at any one time.

The power distribution network 200 may be part of a vehicle 300 such as an aircraft. Each load L1-L3 may associated with one or more operations of the aircraft. For example, each load L1-L3 may be one of a motor, e.g. for an actuator or for a compressor or turbine, an inflight entertainment system, a climate conditioning system (e.g. a HVAC system), or an aircraft control system such as an engine control system or a navigation system, and the like.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A method of controlling an operating voltage of an electrical system for supplying electrical power to a load, the method comprising:
   charging an energy storage unit using electrical power at a predetermined operating voltage, wherein the energy storage unit comprises a capacitor;
   removing the operating voltage;
   discharging the energy storage unit across a fixed load;
   monitoring a discharge voltage across the fixed load over a period of time;
   determining a time constant of the energy storage unit based on the monitored discharge voltage;
   comparing the time constant to a threshold value; and
   one of:
      if the time constant is higher than the threshold value, decreasing the operating voltage; or
      if the time constant is lower than the threshold value, increasing the operating voltage.

2. The method as claimed in claim 1, wherein removing the operating voltage comprises:

disconnecting a supply of electrical power from a power source to the energy storage unit during a shutdown procedure of the electrical system.

3. The method as claimed in claim 1, wherein the threshold value corresponds to a predetermined time constant selected to achieve a desired hold-up time at the predetermined operating voltage.

4. The method as claimed in claim 3, wherein increasing the operating voltage or decreasing the operating voltage comprises:
adjusting the operating voltage to a value determined to achieve the desired hold-up time based on the predetermined time constant, the time constant, and the predetermined operating voltage.

5. The method as claimed in claim 4, further comprising:
replacing the predetermined operating voltage with the adjusted operating voltage.

6. The method as claimed in claim 1, wherein discharging the energy storage unit across the fixed load comprises:
activating a switching element to complete an electrical flow path through the fixed load and the energy storage unit.

7. The method as claimed in claim 1, wherein discharging the energy storage unit across the fixed load is performed once a predetermined time delay has elapsed after removing the operating voltage.

8. The method as claimed in claim 1, wherein charging the energy storage unit is performed simultaneously with supplying electrical power to the load.

9. The method as claimed in claim 1, further comprising:
comparing the time constant to a maintenance threshold value; and
if the time constant is lower than the maintenance threshold value, generating a maintenance signal.

10. An electrical system comprising:
a power source configured to provide electrical power;
a voltage control unit configured to control an operating voltage provided by the power source;
an energy storage unit comprising a capacitor, wherein the energy storage unit is configured to receive the electrical power from the power source and to provide the electrical power to a load;
a fixed load;
a voltage sensor configured to monitor a potential difference across the fixed load; and
a controller configured to:
cause the energy storage unit to be charged using the electrical power;
remove the electrical power from the energy storage unit;
cause the energy storage unit to discharge across the fixed load;
monitor a discharge voltage across the fixed load over a period of time;
determine a time constant of the energy storage unit based on the monitored discharge voltage;
compare the time constant to a threshold value;
if the time constant is higher than the threshold value, cause the voltage control unit to decrease the operating voltage; and
if the time constant is lower than the threshold value, cause the voltage control unit to increase the operating voltage.

11. The electrical system as claimed in claim 10, wherein the controller is configured to initiate a discharge time function to activate a switching device of the fixed load.

12. The electrical system as claimed in claim 10, wherein the electrical system is arranged to supply electrical power to a load associated with one or more operations of an aircraft.

13. The electrical system of claim 10, wherein, to remove the electrical power from the energy storage unit, the controller is configured to disconnect the power source from the energy storage unit during a shutdown procedure of the electrical system.

14. The electrical system of claim 10, wherein the threshold value corresponds to a predetermined time constant selected to achieve a desired hold-up time at the operating voltage.

15. The electrical system of claim 10, wherein, to cause the energy storage unit to discharge across the fixed load, the controller is configured to activate a switching element to complete an electrical flow path through the fixed load and the energy storage unit.

16. The electrical system of claim 10, wherein the controller is configured to cause the energy storage unit to discharge across the fixed load once a predetermined time delay has elapsed after removing the operating voltage.

17. The electrical system of claim 10, wherein the controller is further configured to:
compare the time constant to a maintenance threshold value; and
if the time constant is lower than the maintenance threshold value, generate a maintenance signal.

18. A distributed power architecture comprising:
a plurality of power supplies each configured to supply electrical power at a respective predetermined operating voltage;
a plurality of loads; and
a distribution network arranged to distribute the electrical power from the plurality of power supplies to each of the plurality of loads;
wherein at least one of the power supplies comprises an electrical system, the electrical system comprising:
a voltage control unit configured to control the respective predetermined operating voltage provided by the power supply;
an energy storage unit comprising a capacitor, wherein the energy storage unit is configured to receive the electrical power from the power supply and to provide the electrical power to the distribution network;
a fixed load;
a voltage sensor configured to monitor a potential difference across the fixed load; and
a controller configured to:
cause the energy storage unit to be charged using the electrical power;
remove the electrical power from the energy storage unit;
cause the energy storage unit to discharge across the fixed load;
monitor a discharge voltage across the fixed load over a period of time;
determine a time constant of the energy storage unit based on the monitored discharge voltage;
compare the time constant to a threshold value;
if the time constant is higher than the threshold value, decrease the respective predetermined operating voltage; and
if the time constant is lower than the threshold value, increase the respective predetermined operating voltage.

19. The distributed power architecture as claimed in claim 18, wherein the controller is configured to at least one of increase or decrease the respective predetermined operating voltage of at least two of the power supplies based on the time constant.

20. The distributed power architecture as claimed in claim 18, wherein the loads are associated with one or more operations of an aircraft.

\* \* \* \* \*